Feb. 26, 1924.
A. A. MENDENHALL
1,484,661
SHOCK ABSORBING WHEEL FOR VEHICLES
Filed May 12, 1922
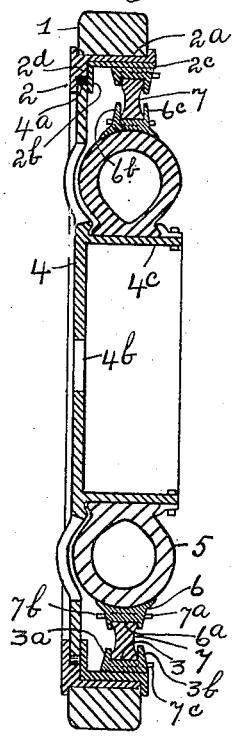
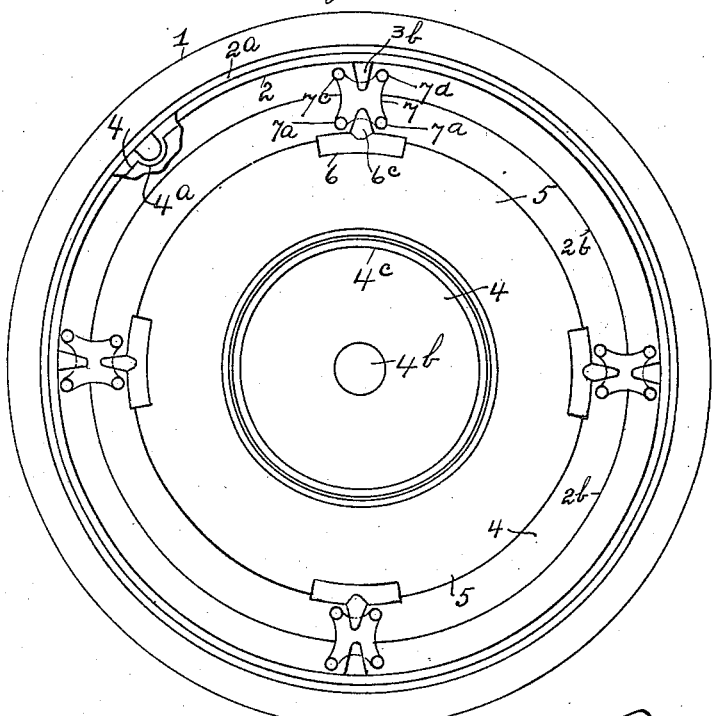
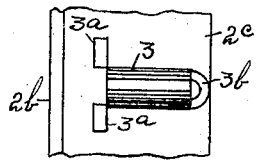
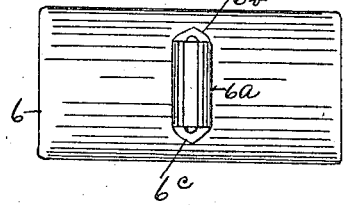
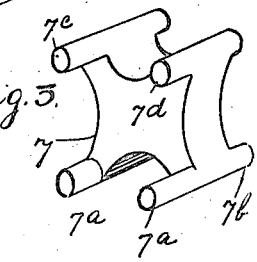
INVENTOR.
Austin A. Mendenhall
BY James T. Watson
ATTORNEYS.

Patented Feb. 26, 1924.

1,484,661

UNITED STATES PATENT OFFICE.

AUSTIN A. MENDENHALL, OF DULUTH, MINNESOTA.

SHOCK-ABSORBING WHEEL FOR VEHICLES.

Application filed May 12, 1922. Serial No. 560,456.

*To all whom it may concern:*

Be it known that I, AUSTIN A. MENDENHALL, a citizen of the United States, residing at Duluth, in the county of St. Louis and State of Minnesota, have invented certain new and useful Improvements in Shock-Absorbing Wheels for Vehicles, of which I do hereby declare the following to be a specification.

My invention relates to shock absorbing wheels for vehicles and has for its object the provision of an improved wheel of that type. It consists of the structures, combinations and arrangements of parts hereinafter described and claimed.

In the drawings, Fig. 1, is a central vertical section of my said invention. Fig. 2, is a side elevation of the same. Fig. 3, is a perspective view of one form of the hereinafter referred to rocking spoke. Fig. 4, is a bottom plan view of the hereinafter described retaining member. Fig. 5, is a top plan view of the hereinafter described bearing plate.

In said drawings, 1, is an exterior tire, preferably of solid or cushion type, of any suitable structure or material, which is mounted upon an exterior rim or felloe comprising a vertical flange 2 and a horizontal web $2^a$, to which web is secured a retaining member or members, comprising a vertical flange $2^b$, spaced from said flange 2, and a horizontal web $2^c$. Positioned between said flanges 2 and $2^b$ at intervals around said felloe, are transversely directed stationary lugs, $2^d$. Depending from the web or webs $2^c$, are stationary pillows 3, across the inner ends of which extend depending fingers or flanges $3^a$ and at the outer ends of which are depending fingers $3^b$. A disc, or hub member 4 having indents $4^a$ formed in its periphery, is adapted to extend loosely into the space between the flanges of said retaining member or members and said felloe, and said indents are adapted to loosely engage said transverse lugs whereby a limited amount of vertical and radial play is permitted between said lugs and said disc. Said hub or disc is centrally apertured as at $4^b$ for the passage of the axle of a vehicle. Extending laterally from the side of said disc or hub member is a support of any suitable structure, as a flange $4^c$, for an interior cushion or pneumatic tire of any suitable structure as 5.

Adapted to bear against the periphery or tread of said interior tire are a plurality of bearing plates 6 of any suitable structure, preferably slightly concave on their under surfaces to conform more or less to the curve of the tire, and preferably slightly convex on their upper surfaces. Each of said bearing plates is positioned radially opposite to a corresponding one of said pillows and upon the back or outer surface of each of said plates is formed or positioned a transversely directed saddle $6^a$ at the opposite ends of which are radially directed fingers $6^b$, $6^c$.

Extending between and loosely engaging said saddles and said pillows are rocking spokes 7 each adapted to rock at one end on one of said pillows and at the other end on one of said saddles, said spokes having fingers $7^a$, $7^b$ formed thereon at one end adapted to loosely engage said fingers $6^b$ and $6^c$, and said spoke having fingers $7^c$, $7^d$, formed thereon at its opposite end adapted to engage said finger $3^b$, whereby said spokes are retained in rocking position, said fingers or flanges $3^a$, $3^b$, $6^b$ and $6^c$ also operate to prevent the lateral disengagement of said spokes from said pillows and saddles.

Said spokes at the limit of their rocking movements are adapted to lift slightly from said pillows and from said saddles and to bear at one side of one end against the web of said retaining member and to bear at the opposite side of the other end upon said plate at one side of said saddle, thus through its longer axis increasing the pressure upon said plate and interior tire and preventing further slip of said tire. It will be noted especially that such increased pressure is exerted near the center of such bearing plate and the tendency of the end of the bearing plate to dig into the interior tire is thus greatly reduced.

It is obvious that said combination may be modified in various particulars within the spirit and scope of certain of my claims.

What I claim is—

1. In a shock absorbing wheel, the combination with a felloe of a hub member within said felloe, said hub member being adapted to play in a vertical plane with respect to said felloe, a resilient tire within said felloe and mounted upon said hub member at one side thereof, plates positioned at intervals around said resilient tire and adapted to bear against the tread or crest thereof, said plates having transversely extending saddles positioned upon their outer faces, rocker spokes loosely mounted upon said saddles, stationary pillows interposed between said spokes and said felloe, said spokes being adapted to rock at one end upon said pillows and at the opposite end upon said saddles, and means for preventing the disengagement of said spokes from said saddles and pillows.

2. In a shock absorbing wheel, the combination with a felloe, of a hub member adapted to play in a vertical plane within said felloe, means for limiting the play of said hub with respect to said felloe, means for retaining said hub in operative position with respect to said felloe, a resilient tire mounted upon said hub member at one side thereof, plates positioned at intervals around said tire and adapted to bear against the tread or crest thereof, said plate having saddles positioned upon their outer faces, rocker spokes loosely mounted upon said saddles, stationary pillows interposed between said spokes and said felloe, said spokes being adapted to rock at one end upon said pillows and at the opposite end upon said saddles.

3. In a shock absorbing wheel, the combination with a felloe, of a hub member within said felloe, a resilient tire mounted upon said hub member, a bearing plate positioned on the crest or tread of said tire, a spoke loosely mounted on said plate and adapted to rock thereon, stationary means interposed between the opposite end of said spoke and said felloe for engaging said spoke, said spoke being adapted to have a rocking engagement with said interposed means.

4. In a shock absorbing wheel, the combination with a felloe, of a hub member adapted to have a limited play with respect to said felloe, a resilient tire mounted upon said hub, a bearing plate positioned upon the crest or tread of said tire, a saddle carried by said plate, a rocker spoke loosely mounted upon said saddle, a pillow carried by said felloe and adapted to loosely engage the opposite end of said spoke, said spoke being adapted to rock at one end upon said saddle and to rock at the opposite end upon said pillow, said spoke being adapted near the extreme of such rocking movement to tilt from said saddle and to bear upon said plate at one side of said saddle.

5. In a shock absorbing wheel the combination of a felloe, of a hub member adapted to have a limited play within said felloe, a resilient tire mounted on said hub member, a bearing plate positioned upon the crest or tread of said tire, a saddle extending from said plate, a rocker spoke loosely mounted upon said saddle, a pillow positioned upon said felloe and adapted to loosely engage the opposite end of said spoke, said spoke being adapted to rock at one end upon said saddle and to rock at the opposite end upon said pillow, said spoke being adapted near the extreme of said rocking movement to lift from said pillow and to bear upon the pillow plate or felloe at one side of said pillow.

6. In a shock absorbing wheel, the combination with a felloe of a hub member adapted to have a limited play with relation to said felloe, a resilient tire mounted upon said hub member, a bearing plate positioned upon the crest or tread of said tire, a saddle positioned on said plate, a pillow positioned upon said felloe, a rocker spoke interposed between said saddle and said pillow and adapted to loosely engage the same and to rock at one end upon said saddle and at the opposite end upon said pillow, said spoke being adapted near the extreme of its rocking movement to lift from said saddle and to bear upon said plate at one side of said saddle, and to lift from said pillow and to bear upon the pillow support or felloe at the opposite side of said pillow, thereby increasing the bearing length of said spoke.

In testimony whereof, I hereunto affix my signature, in presence of two witnesses.

AUSTIN A. MENDENHALL.

Witnesses:
A. J. MARK,
JAMES T. WATSON.